United States Patent
Kindeberg

(10) Patent No.: US 8,199,014 B1
(45) Date of Patent: Jun. 12, 2012

(54) SYSTEM, DEVICE AND METHOD FOR KEEPING TRACK OF PORTABLE ITEMS BY MEANS OF A MOBILE ELECTRONIC DEVICE

(75) Inventor: Susanne Kindeberg, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 1383 days.

(21) Appl. No.: 11/770,816

(22) Filed: Jun. 29, 2007

(51) Int. Cl.
*G08B 13/14* (2006.01)

(52) U.S. Cl. ............. 340/572.1; 340/568.1; 340/539.32; 340/10.1

(58) Field of Classification Search ........... 340/572.1, 340/573.4, 568.1, 539.32, 825.49, 687, 10.1, 340/3.51
See application file for complete search history.

(56) References Cited

U.S. PATENT DOCUMENTS

| | | | |
|---|---|---|---|
| 7,523,132 B2 * | 4/2009 | Altounian et al. ............... 1/1 |
| 7,551,780 B2 * | 6/2009 | Nudd et al. .................. 382/190 |
| 7,591,413 B1 * | 9/2009 | Block et al. .................. 235/379 |
| 2005/0088302 A1 * | 4/2005 | Pucci et al. ................. 340/568.1 |
| 2006/0022823 A1 * | 2/2006 | Ryal ........................... 340/572.1 |
| 2007/0228140 A1 * | 10/2007 | Kumagai et al. .............. 235/375 |

OTHER PUBLICATIONS

International Search Report and Written Opinion from corresponding Application No. PCT/EP2007/063785 mailed Jun. 2, 2008.

* cited by examiner

*Primary Examiner* — Daniel Previl
(74) *Attorney, Agent, or Firm* — Renner, Otto, Boisselle & Sklar, LLP

(57) ABSTRACT

The present invention relates to the field of mobile communications, and in particular to a system for near field wireless data communication using RFID for checking whether a portable item is to be brought by a user from one place to another or not by using a mobile electronic device comprising a radio communication device and a method for achieving this.

13 Claims, 3 Drawing Sheets

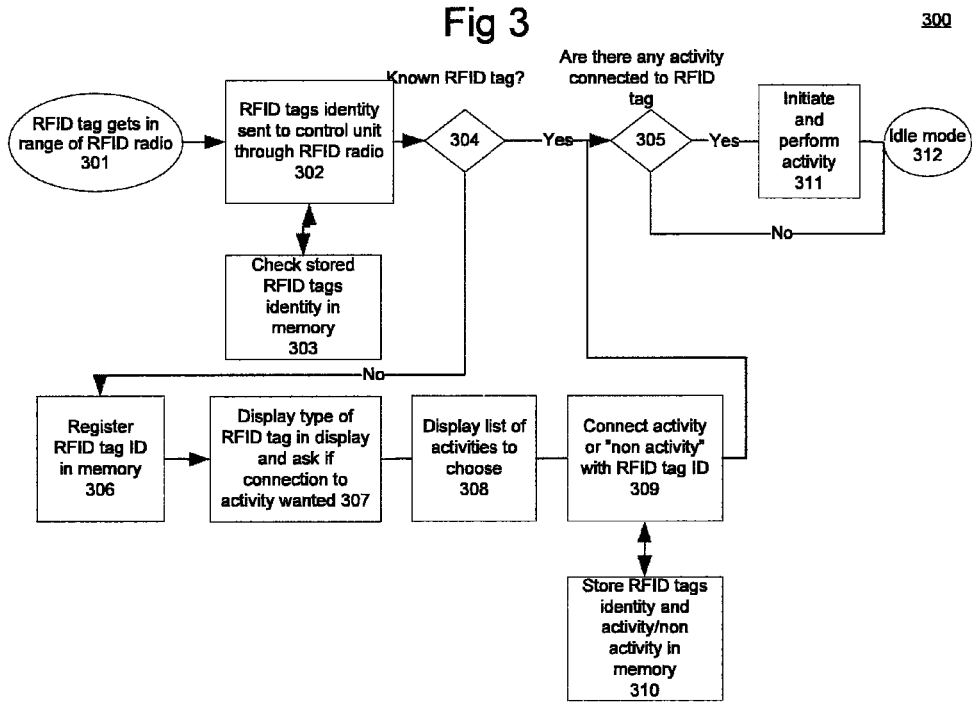
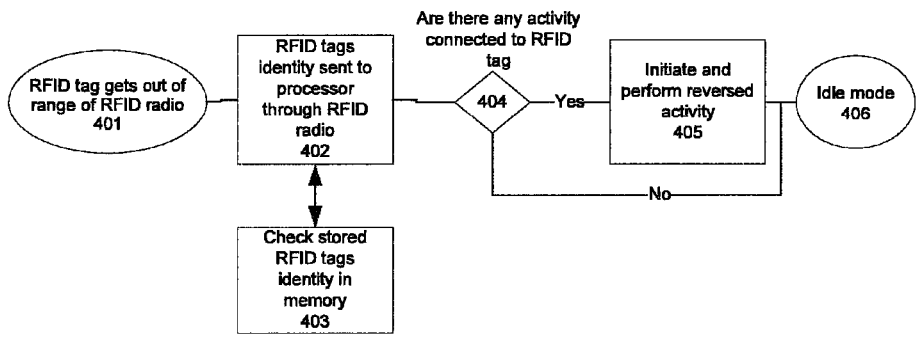
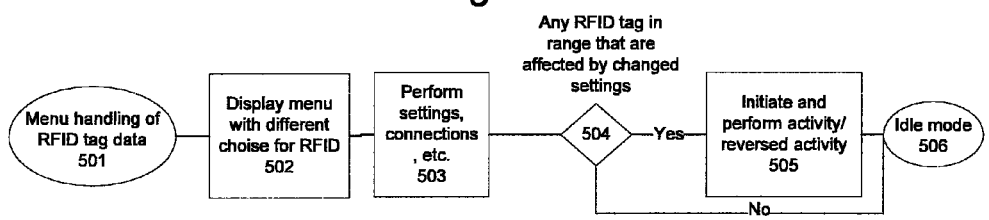

SYSTEM, DEVICE AND METHOD FOR KEEPING TRACK OF PORTABLE ITEMS BY MEANS OF A MOBILE ELECTRONIC DEVICE

TECHNICAL FIELD OF THE INVENTION

The present invention relates to the field of mobile communications, and in particular to a system for wireless data communication for checking if useful items are to be stored in a handbag or not by using a mobile electronic device comprising a radio communication device and a method for achieving this.

DESCRIPTION OF RELATED ART

Nowadays, persons, both men and women, are very busy, leaving home with a lot of portable items, e.g. keys for their house, car and/or work, purse, cellular/mobile phones, laptop computers, Personal Digital Assistants (PDA:s), credit and point cards for buying food and other stuff, different types of membership cards, e.g. for training, commuter cards, ID cards and many more different items to be used for different needs and occasions, i.e. at work, when shopping, at a party etc. Today, the use of mobile devices, e.g. cellular/mobile phones, laptop computers and Personal Digital Assistants (PDA:s), that communicate wireless also increases. This means that users bring the mobile devices with them wherever they go, e.g. to the office and back home, into their car, to meetings, and so on. This behaviour has increased the number of items to be brought for different needs given raise to problems of forgetting one or more items when going from one place to another, e.g. when leaving home for work or training.

Prior art uses for example radio-frequency identification (RFID) for keeping track of portable items, e.g. when buying food items that are tagged with RFID-tags, by registering each purchased RFID tagged item at the paydesk without any communication with the buyer or consumer.

SUMMARY

The present invention relates to a system, a device and a method using radio-frequency identification (RFID) to wirelessly check if portable items are to be stored or not in a handbag or pocket, and/or to check if the appropriate items are present or not in the handbag or pocket, by using a mobile electronic device, both automatically and/or manually, i.e. by manual initiation from the user when required. This reduces the risk of forgetting appropriate items to be brought from one place to another when necessary and/or desired.

The invention uses a system for RFID data communication, comprising a mobile electronic device with a control unit that is operatively connected to a RFID reader and a memory for storing a plurality of RFID tag data, at least one portable item that an user of the mobile electronic device optionally may take with him/her and which item for identification is provided with at least one by the mobile electronic device wirelessly connectable RFID tag, which control unit, depending on the RFID tag data for the portable item, is adapted to check whether the user should take the RFID tagged portable item with him/her or not and to perform an activity that changes or maintains the functionality of the mobile electronic device in accordance with the checked RFID tag data.

In one embodiment of the invention the control unit is configured to compare the received RFID tag data with RFID tag data stored in the memory, and to check whether the RFID tagged portable item that the user should take with him/her is accessible or not in accordance with the received RFID tag data.

In another embodiment of the invention the control unit is configured to detect if the portable item with its RFID tag is missing/out of range, and to compare the data of a missing/out of range RFID tag with the stored RFID tag data, and to perform an activity that changes the functionality of the mobile device for alerting the user if an item is missing, which item the user should take with him/her in accordance with the data of the checked RFID tag.

Moreover, the invention uses a mobile phone comprising a mobile electronic device as defined above, wherein the control unit is operatively connected to a display and a GSM and/or UMTS radio. Furthermore, the invention also uses a radio communication device for RFID data communication, comprising a RFID reader that is operatively connected to a mobile electronic device as defined above.

The invention also uses a method for checking whether a user should take at least one portable item with him/her or not by using RFID data communication, comprising providing the portable item with at least one RFID tag; transmitting a radio signal to the RFID tag by means of the mobile electronic device as defined above, receiving a response signal comprising RFID tag data from the RFID tag associated with the portable item by the mobile electronic device, and checking whether the user should take the RFID tagged portable item with him/her or not, depending on the RFID tag data, and performing an activity that changes or maintains the functionality of the mobile electronic device in accordance with the checked RFID tag data. This is done in one embodiment by comparing the received RFID tag data with stored RFID tag data, and checking whether the RFID tagged portable item that the user should take with him/her is accessible or not in accordance with the checked RFID tag data.

Another method according to the invention comprises detecting if the portable item with its RFID tag is missing/out of range, comparing the data of the RFID tag of a missing/out of range item with the stored RFID tag data for the associated portable item, and performing an activity that changes the functionality of the mobile electronic device for alerting the user that at least one item is missing, which the user should take with him/her in accordance with the checked RFID tag data.

Moreover, according to the invention, the portable item is at least one of the following items: purse, key, lipstick, umbrella, gym entrance card, make-up, commuter-card, credit/ID/parking card, car keys, or lunch coupons.

The invention simplifies keeping track of portable items that are for daily, or at least frequent use by the usage and handling of a mobile electronic device by using RFID data communication. Furthermore, the invention achieves this advantage in a cheap and cost-efficient way by using RFID data communication due to the fact that RFID tags are cheap and easy to mount on portable items, in general small items, and to place in suitable positions and locations. This invention also eliminates the need of separate RFID readers, whereby for example mobile phones are used for this instead.

The terminology used herein is for the purpose of describing particular embodiments only and is not intended to be limiting of the invention. As used herein, the singular forms "a", "an" and "the" are intended to include the plural forms as well, unless the context clearly indicates otherwise. It should also be emphasised that the term "comprises/comprising" when used in this specification is taken to specify the presence of stated features, integers, steps or components but does not preclude the presence or addition of one or more other features, elements, integers, steps, components or groups thereof.

BRIEF DESCRIPTION OF THE DRAWINGS

The features and advantages of the present invention will be more apparent from the following description of the invention with reference to the accompanying drawings, on which:

FIGS. 3 to 5 schematically illustrate methods according to different embodiments of the invention in block diagrams.

DETAILED DESCRIPTION OF EMBODIMENTS

Figure 1:
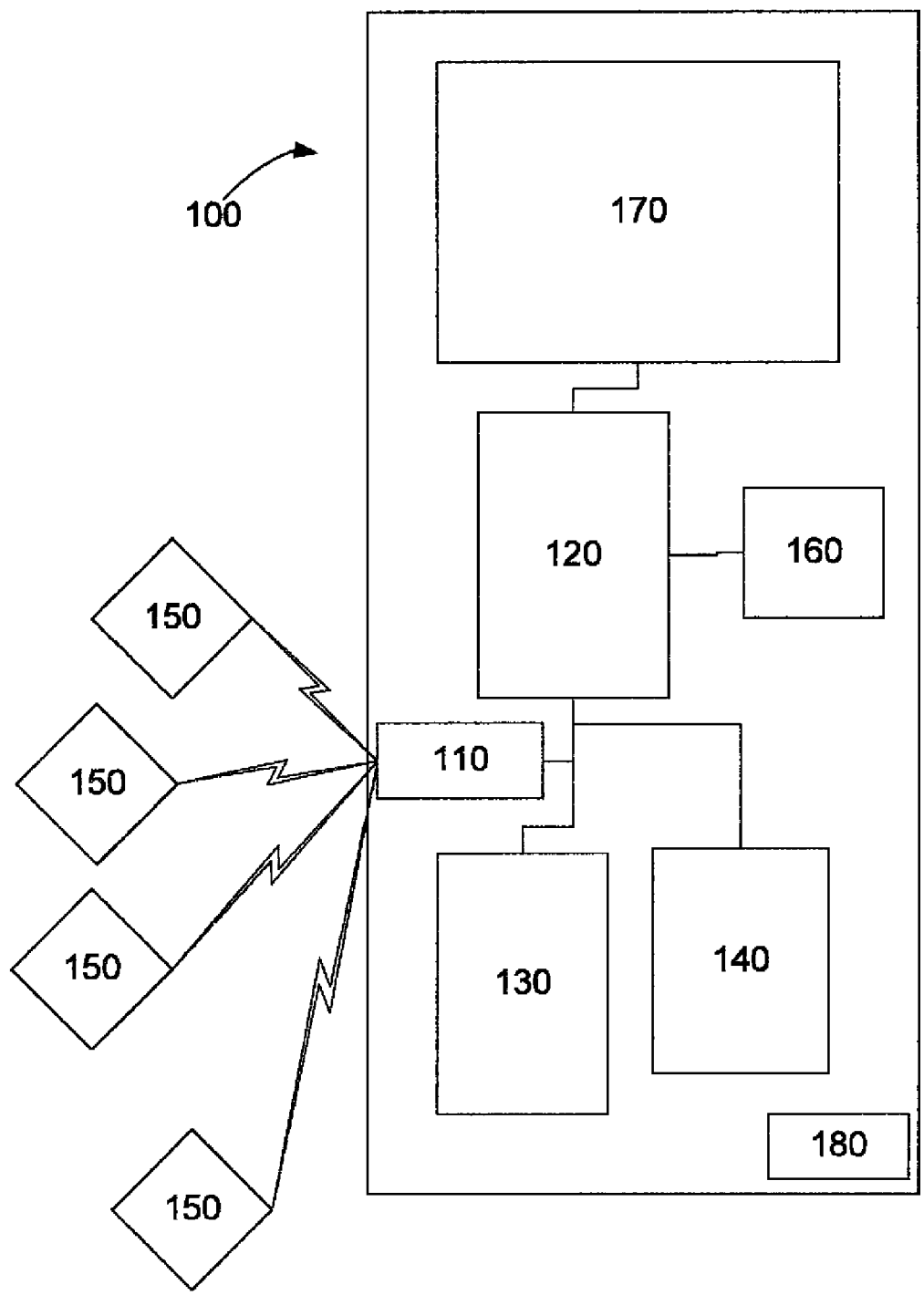
FIG. 1 schematically illustrates an embodiment according to the present invention comprising a wireless communications system with tagged portable items and a mobile electronic device for keeping track of these items.
Figure 2:
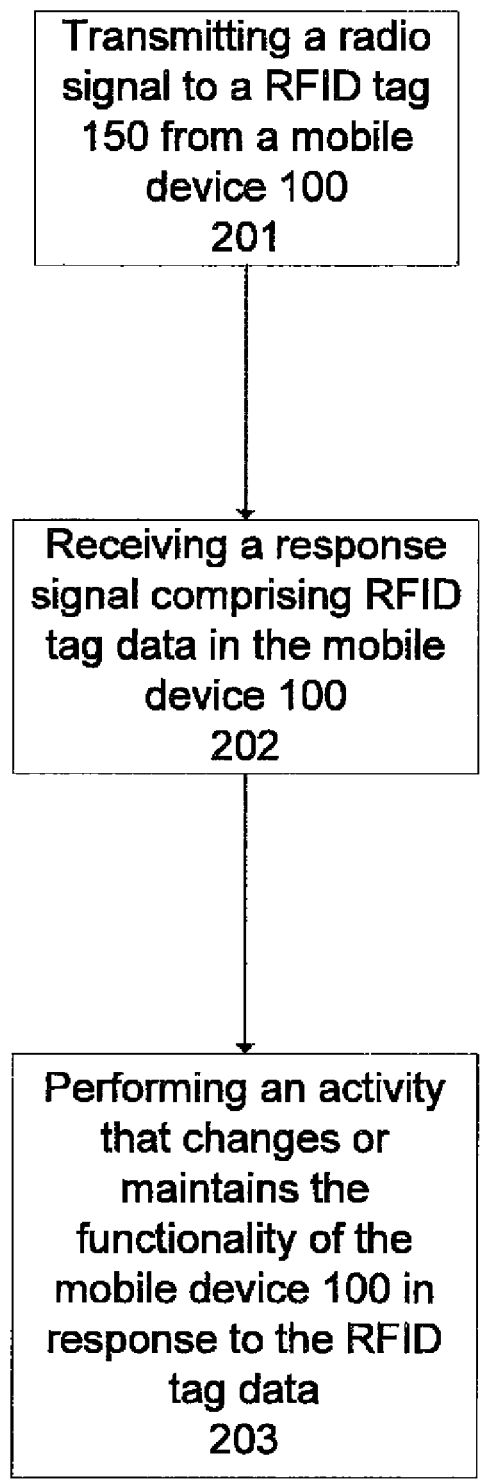
FIG. 2 schematically illustrates a method according to an embodiment of the invention in a block diagram.

Radio Frequency Identification, or RFID, is a generic term for technologies that use radio waves to automatically identify people or objects. There are several methods of identification, but the most common is to store a serial number that identifies a person or object, and/or other information, on a microchip that is attached to an antenna (the chip and the antenna together are called an RFID transponder or an RFID tag). The antenna enables the chip to transmit the identification information to a RFID reader. The reader converts the radio waves reflected/sent back from the RFID tag into digital information that can then be passed on to and for example used in computers. A typical RFID system consists of at least one RFID tag made up of a microchip with an antenna, and an RFID interrogator or reader with an antenna. The reader sends out electromagnetic waves and the tag antenna is tuned to receive these waves. The chip then modulates the waves that the tag sends back to the reader, which converts the new waves into digital data that are communicated to a control unit or processor for further processing or use.

RFID systems are for example used for tracking animals to triggering equipment down oil wells. The most common RFID applications are payment systems (toll and fare collection systems, for instance), access control and asset tracking. Increasingly, companies use RFID technology to track goods within their supply chain, to work in process and for other applications.

There are two types of RFID tags, active and passive. Active RFID tags have a transmitter and their own power source (typically a battery). The power source is used to run the microchip's circuitry and to send a signal to the RFID reader (similar to a cellular phone transmitting signals to a base station). Passive tags have no battery; instead, they draw power from the RFID reader, which sends out electromagnetic waves that induce a current in the RFID tag's antenna. Semi-passive tags use a battery to run the chip's circuitry, but communicate by drawing power from the reader. Active and semi-passive tags are useful for tracking high-value goods that need to be scanned over long ranges, such as railway cars on a track, hut they cost more than passive tags, which means that they are not used on low-cost items.

The distance from which a tag can be read is called its read range. Read range depends on a number of factors, including the frequency of the radio waves used for tag-reader communication, the size of the tag antenna, the power output of the reader and its size of the antenna, and whether the RFID tags have a battery to broadcast a signal or gather energy from a reader and merely reflect a weak signal back to the reader. If the tags are attached to products with water or metal, the read range can be significantly less. If the size of the UHF antenna on UHF tags—the kind used on pallets and cases of goods in the supply chain—is reduced, that will also dramatically reduce the read range. Increasing the power output could increase the range, but most governments restrict the output of readers so that they don't interfere with other RE devices, such as cordless phones.

RFID systems use many different frequencies, hut generally the most common are low-frequency (around 125 KHz), high-frequency (13.56 MHz) and ultra-high-frequency or UHF (860-960 MHz). Radio waves behave differently at different frequencies, whereby a suitable frequency has to be chosen for the application.

There are companies developing technology that could make active tags far less expensive than they are today, End-users are focusing on passive UHF tags, which cost less than active ones. Their read range isn't as far as active tags but can be disposed of with the product packaging without any great economic loss. RFID tags are cheap to manufacture and are more useful for applications where the tag will be disposed of with the product packaging.

In the present invention, as shown in FIG. 1, any suitable radio frequency may be used, i.e. from low-frequency to ultra-high-frequency, and is preferred for wireless communication between a mobile electronic device 100 and at least one portable item 150 provided, i.e. tagged with at least one RFID tag, in the vicinity, whereby different frequencies determine different distances between the mobile device and the tag on the portable item 150 for when the tag gets into and out of read range for the mobile device.

The present invention is described below with reference to block diagrams and/or flowchart illustrations of methods, systems, and devices according to embodiments of the invention, i.e. FIGS. 1-5. It is understood that several blocks of the block diagrams and/or flowchart illustrations, and combinations of blocks in the block diagrams and/or flowchart illustrations, can be implemented by computer program instructions used in the system and/or device. Accordingly, the present invention may be embodied in present hardware and software (including firmware, resident software, micro-code, etc.) or may be placed in a separate module incorporated in a mobile electronic device for use or as an external accessory communicating through USB or another available communication bus.

The present invention relates to a RFID data communications system comprising portable items 150, each portable item provided with identification information in the form of at least one RFID tag, and a portable device, i.e. a portable radio communications device, e.g. the mobile electronic device 100. In the context of the invention, the mobile device may be a mobile/cellular phone, a PDA or any other type of portable computer, such as a laptop computer.

Referring to FIG. 1, the mobile device 100 is disclosed. The mobile device 100 comprises an antenna 110 which in one embodiment of the present invention is a combined GSM and RFID antenna or a UMTS and RFID antenna and in another embodiment the antenna is a separate RFID antenna 110. However, it should be understood that the mobile device 100 may be equipped with separated antennas such as a GPS antenna and a GSM antenna and a RFID antenna or just one type of combined antenna such as an UMTS, GSM, EDGE, GPRS, CSD, RFID antenna or the like. In any case, device 100 is configured, by means of antenna 110, to transmit wireless signals as in step 201 in FIG. 2 and receive wireless signals comprising data from any RFID tag in/on a portable item 150 in the vicinity, as in step 202 of FIG. 2. The antenna 110 in the illustrated embodiment may be a solid external antenna but may as well be an extendable antenna or an internal antenna. Antenna 110 is connected to a control unit 120, which comprises a signal transceiver and operatively connected to a RFID reader, i.e. RFID radio unit 130, which is configured to receive wireless information including information/data from any nearby RFID tag 150 within range, and may in one embodiment also be connected to a GSM and/or UMTS radio unit 140, which is configured to receive wireless information including information from a cellular network and/or a GPS system. The control unit 120 typically includes a central processing unit CPU with associated memory 160 and software, and is configured to control the processes carried out within the device 100. The signal transceiver is connected to the control unit, inter alia for communication of data, i.e. information received by means of the antenna 110. The information received in the device 100 is in the form of data which needs to be analyzed to determine if an activity is to be performed or not in response to the data received from the RFID tagged item 150 nearby, as will be explained, with the purpose of keeping track of these items and to check whether the user should take the RFID tagged portable item with him/her or not and to perform an activity that changes or maintains the functionality of the mobile electronic device 100 in accordance with the checked RFID tag data for this item. The control unit 120 is also configured to check whether the tagged portable item 150 that the user should take with him/her is accessible or not, and for alerting the user of a missing item that the user should take with him/her, i.e. to perform measures to be taken for changing or maintaining the functionality of the device 100 based on the information from the associated RFID tag on the associated item 150 (see step 203 in FIG. 2) manually. Alternatively, the information received from the RFID tag may be handled automatically without any interaction from the user of the mobile device 100, so that changing or maintaining different functions and/or functionality of the mobile device is initiated fully automatic. The user may or may not choose manual initiation of a measure that either changes or maintains the current functionality of the device 100. In other embodiments of the invention, certain missing RFID tagged items 150 would for example always change the current functionality of the mobile device by turning on an alarm, e.g. a sound and/or vibration for alerting the user of one or more missing items or perform other predefined scenarios or standardized functions.

The steering/control of the current functionality in the mobile electronic device 100 for keeping track of appropriate portable items 150 to be or not be brought by the user of the mobile electronic device is done by using short-range positioning beacons, i.e. the at least one RFID tag attached to each item 150 getting into range of the RFID radio/reader 130 and communicating with the RFID reader (step 301 in FIG. 3). This method is applicable for finding portable items in relatively small areas, depending on the used radio frequency for communication, such as a single building, but also along frequently visited paths, e.g. in different rooms at home and/or work, wherein also a local area network of RFID systems can provide locations along with other services for checking the whereabouts of any item 150 to be found and to be put in or out of a handbag or a pocket.

The position of the portable item 150 to be found by means of the mobile electronic device 100 determined by means of the received information from the RFID tag on that item 150 relating to a current position, and the application to be launched or not, are used in combination by control unit 120 to select a profile which is usage and/or position-dependent, i.e. if the item is missing or a new item not earlier used, for example at home, in the car or at work, either automatically or manually by the user, and to load and execute the selected application using parameters determined in the selected profile or to "programme" a new application for a new item 150 with new RFID tag data (steps 304-3120 in FIG. 3). The profiles may be manually programmed in advance by means of a graphical user interface (GUI) of mobile device 100, typically a keypad and a display 170 with a menu system. As an alternative, profiles may be stored according to usage, i.e. if the item 150 is to be used when going to work, to training, or home etc. In one embodiment, a profile may be stored when a certain application is to be launched in accordance with certain RFID tag data for the first time, which may not have been previously detected by the mobile electronic device 100, e.g. if a new portable item 150 to be provided with a new RFID tag not earlier used is purchased. This way of finding missing items may be realized by using the RFID or NFC standard ISO 156 93.

In the illustrated embodiment of FIG. 1, the profiles are stored in the memory 160 which may be a random access memory (RAM), a read-only memory (ROM) and an erasable programmable read-only memory (EPROM or Flash memory). Each profile is stored in memory 160 together with one or more related settings for different applications, for use by the mobile electronic device 100, i.e. the control unit 120 in order to steer the functionality of the mobile device by using received data from one or more RFID tagged items 150 in the wireless network, such as a low-frequency, high-frequency and ultra-high-frequency or UHF RFID system. An IEEE 802.11 type WLAN, a WiMAX, a HiperLAN, a Bluetooth LAN, or a cellular mobile communications network such as a GPRS network, or a third generation WCDMA network can then be used for providing a communication channel where more information could be downloaded based on the initial data provided by the RFID tag of the specific item 150 initiating this WLAN, Wimax, HiperLAN or GPRS network communication.

The mobile device 100 is configured to automatically use the relevant settings for an application in a certain position or to give the user choices of settings that may be manually chosen by him to use the item 150 having the RFID tag data within range or not. This way drainage of a battery 180 of the mobile device is reduced, since communication by RFID consumes less power than for example GSM or GPS communication. This means that even though the mobile device 100 needs to run a scanning process in order to search and identify any RFID tagged items 150 in nearby wireless networks the power required for this is less than the power required for GSM or GPS communication.

Referring now to FIGS. 3 to 5, the operation of the mobile electronic device 100 in a system or network 300, 400, 500 is illustrated. A user of the mobile device 100 leaves home or work, herein referred to as the office (see FIGS. 3 and 4). The office may be a building, a floor, a room or the like. The size may be related to the obtainable position accuracy, but even if there are different portable RFID tagged items 150 within the office they may collectively be defined in the profile as one position, i.e. the position of the office. Before leaving the home or the office, or any other place, the user wants to check if all appropriate items are brought with him/her in the handbag or pocket, and if not, wants help to find their whereabouts when searching for any missing item.

The user initiates manually an application or an application launches automatically, as defined earlier by the user, which involves setting up of a connection to a RFID system, see FIGS. 2 to 5, when the mobile device 100 has received data from an adjacent RFID tag 150. The user may define application profiles associated with specific portable items 150 with RFID tags and store them in the memory 160 for manual initiation or automatic launching in order to change or maintain the functionality of the mobile device when data from a nearby item and its RFID tag is received. The initiation of the application preferably includes automatic launching of for example a shopping mode, training mode, or a work mode for the mobile electronic device 100 when leaving home, work, or a meeting room and connecting to an item with a RFID home, shopping or work defined tag, but may of course also include launching an application where a manual selection in a menu system or activation of an icon in a graphical user interface of mobile device 100 is done, such that the mobile electronic device 100 checks if any item to be used when shopping, training, working etc is missing, and prompts the user about the missing item if necessary.

In FIG. 1 the mobile electronic device 100 is illustrated as a mobile phone, which is the best mode known to date for implementation of the present invention. Although not outlined in detail, mobile device 100 may therefore include, in addition to the elements mentioned earlier, a touch-sensitive sheet provided on the display 170, a speaker and a microphone.

The position of the mobile electronic device 100 in relation to adjacent RFID tagged items 150 may be checked by an intermittent scan with a low duty cycle of about 1%, e.g. with a 5 ms to 20 ms scan window every one second, or preferably a 10 ms scan window every one second, and automatically determined or determined following the manual selection of an application.

Each of the RFID tagged items 150 has an ID that may be associated with desired items, e.g. items used at work, at home, e.g. keys, commuter card, for the car, e.g. car keys, driver license, favourite music, by the user. Items with RFID tags that have or should have no active function, i.e. they are passive, must also be registered in the memory 160 so that no automatic function is initiated or that no question about a new manual tag registration is prompted for the user next time this item and tag gets in range of the mobile electronic device 100.

The storing of specific RFID data associated with a certain RFID tagged item 150 may be done as parameters in a specified storage field, in a predefined type of file or in a small data base in the mobile electronic device 100.

The position of the portable item 150 to be checked in relation to the mobile device 100 is established by comparing the received data from the associated RFID tagged item with the RFID tag data contained in memory 160 by means of the control unit 120 and the memory, a profile related to the stored RFID tag data containing settings for different applications is automatically selected, if a match is found, or manually initiated by the user, if the RFID tag data is unknown, i.e. not found in the stored data, as shown in FIGS. 3 to 5. In one embodiment, a user may initiate an application in an area related to a certain position, wherein the user needs to manually select an application client, or alternatively the application is initiated with a default setting automatically. The user may also be requested via the GUI (steps 304-310 in FIG. 3) to respond whether the settings for the application should be stored in a new profile related to the new position or the new RFID tagged item 150 in question, which is determined by means of received data. In one embodiment it should also be possible to override the automatic selection of settings and launching of application based on matching of received RFID tag data with stored RFID tag data. This may be obtained by displaying, upon selection of an application in the mobile device 100, a question to the user whether or not to use stored settings. Answer Yes launches the application client linked to the profile in question with the associated stored settings of the associated RFID tagged item 150 for checking if it is to be brought by the user, if it is missing, and, in that case, its whereabouts, for control of the mobile device functionality (steps 305-312 in FIG. 3) to help the user to keep track of desired items. Answer No opens a menu in which the different parameters for launching the application or not can be selected. Also after such a scenario, i.e. when manual setting is made in a position and for an application which are already linked to each other in an existing profile in memory 160, the existing profile may be amended. Each profile is preferably uniquely identified with the determined RFID tag, and in combination with a selected application the settings to be used for launching that application, either automatically or after a manual initiation, are prescribed in the profile. In case the user wants to store the settings of the application in a new profile, a text description of the profile may be inserted automatically or manually by the user via the GUI, as in FIGS. 3 and 5. In another embodiment the application settings may be stored automatically when an application for an item 150 is used in a position never used before, i.e. when data from a new RFID tagged item is received and no match is found in the earlier stored RFID tag data.

The invention relates to everyday usage, wherein the features could be added, or seen as an extension, to the Organizer, Profile, Calendar and Location Based Services. The basic idea is to provide a "Handbag Content Reminder" and is specifically aimed at female users but may equally be aimed at male users. In the menus/settings/profiles, as explained above, a list of predefined contexts is provided, that could also be customized by the user as mentioned above. Examples of such contexts could be Office, Shopping, Party, Training, and Walking Various items 150 that are generally included in a lady's handbag/pocket are preferably tagged by RFID tags. The gain would be that several valuable minutes thereby could be saved when leaving home in a hurry by letting the mobile electronic device 100, e.g. a mobile phone, check if all appropriate items are part of the handbag and/or the pocket, i.e. purse and keys would be standard for every occasion. With this solution according to the invention tailed contents of the handbag/pocket would help the user to remember to bring specific items for different context/usage. A setting used for a profile "Office" may for example be bringing the lap top, car keys if driving to work, commuter card if using public services for getting to work, purse, ID-card, lunch coupons, day make up, and pen and note book, when using a "Shopping"-profile, the purse, point cards, and credit cards should be brought, and when using a profile designated "Party", the purse, cigarettes, lighter, evening make up, and taxi card should be brought by the user.

The items 150 tagged is connected with the mobile phone 100 using technology, e.g RFID, that also helps the user finding any missing item by searching and get sound feedback when getting close to them. Assuming that the phone is configured with information so that every morning I am leaving for the office, the device itself activates and call for my attention if items defined as "office musts" is missing, while leaving home. Using the phones loudspeaker the notification can be given without the user having to interact with the phone. This is achieved by providing the entrance door of a home with a RFID-tag that automatically initiates the check of the handbag's content. If items are missing the user is notified by the phone informing that e.g the ID-card is missing.

In a preferred embodiment, each combination of profile and application according to the invention may also comprise information on prescribed client and security aspects, and these settings are preferably automatically configured by mobile device 100 based on the received data from the associated RFID tagged item 150, or chosen manually by the user. However, the setting up of a RFID connection for a need of an portable item 150 not stored in memory 160 must be performed manually by the user (steps 306-310 in FIG. 3), and the automatic procedure is only performed for items known in the memory.

FIG. 4 shows when the at least one RFID tagged item 150 is/gets out of range of the mobile electronic device 100 (step 401), i.e. the item is missing in the handbag or pocket, this being detected by the mobile phone "handshaking" with the RFID reader at the entrance door on the way out. The identity of the "lost"/missing RFID tag is sent to the control unit 120 (step 402), and the missing RFID tag ID is checked (compared with memory 160, step 403). Then, in step 404, it is checked whether the missing item comprising the tag is associated with an activity or not, and if there is an associated activity, a search mode is initiated and performed, in step 405, whereupon the mobile device 100 is set to a new mode, e.g. an idle mode as in step 406. If no activity is associated with the missing/"out of range" RFID tag, e.g. if the associated item 150 is not to be brought by the user, the mobile device maintains its current mode, e.g. an idle mode as in step 406.

Moreover, the control unit 120 may also use the calendar in the mobile phone that has been configured with the overall schedule for the user's typical week during the RFID communication, so that the mobile phone keeps track of the individual's typical week. This means that other affected applications that may be controlled in the mobile phone by means of the inventive RFID communication system are for example a GPS-function, a Browser in the phone, a Sport application, e.g. when running, the Profiles as mentioned, and a music player in the phone.

Another user case called "Office" concerns leaving home between 8.00-9.00 on weekdays and means that the user is on the way to the office. The handbag/pocket should then be equipped with certain collection of items, e.g. purse, key, ID card, lipstick and umbrella. Automatically the phone turns on the GPS-receiver and switches profile, so that the silent mode is turned off, since it is always set to on during the nights by this user. A user case called "The gym" concerns leaving home Tuesday and Thursday between 18.00-19.00 and means that the user is on the way to the gym. The items 150 to be in the handbag is the gym entrance card, key and purse, When passing the reader the GPS and sport application are initiated, since the user is using the way to the gym to warm up and wants to keep track of his condition. The music player also automatically starts. Furthermore, a user case called "Going out" concerns going out Friday and Saturday night, leaving home, and means that the user is going out to a restaurant or party. The handbag should then contain the make-up bag, commuter-card, wallet and keys and the phone turns to silent mode as the user does not want to be disturbed by incoming calls during the evening. One user case called "Shopping" concerns that the user on Saturday morning is going to the market-time. Then, the wallet with credit cards and/or money, the car keys, and the parking card should be in the handbag, The Browser also starts, so that the nearby supermarket's webpage is shown, which provides discount coupons that the user can use in the shops. As the user will drive the car the profile switches to "Car"-defined profile automatically, e.g. if a RFID reader is placed in the car, so that the user can use the Hands-free equipment easily. Another user case is called "Outdoors" concerns that passing the entrance door on Saturday and Sunday afternoon means going out for outdoor activities. GPS is initiated for a step counter function and the weather service opens up in the browser of the phone. In cases when one or more items 150 are missing for the scheduled activities the mobile phone provides a Sound indication to get the users attention. The user could for example either: a) ignore the Sound notification and after a while the phone will turn silent again (time-out) or b) the user returns to the apartment holding the handbag/phone closely to likely place it where the missing items could be. When approaching a missing item there is another sound indication notifying the user that the item is near, the missing item is found and the user can happily leave home, just a few minutes delayed.

In FIG. 5, a menu handling of the RFID tagged item 150 and its data is shown (step 501). Here, a menu is shown on the display 170 of the mobile device 100 with different RFID choices for the user to choose among in step 502, whereby chosen settings, connections etc may be performed in step 503. Then, the presence of any RFID tagged item 150 in range and if the tag is affected by the chosen functionality are checked and if the answer is Yes, an activity, going to work, or reversed activity, coming home from work, is initiated and performed in the mobile device in step 505, while, if the answer is No, the mobile device maintains its current mode/functionality, e.g. an idle mode as in step 506 or any other chosen mobile device mode.

In general, the most frequently used and needed items 150 are already present in the handbag, a briefcase, and/or the pocket of the user when for example leaving home. The invention reduces the slip of memory for the user by notifying the user of missing items making it easier for the user to bring necessary and/or desired portable items, especially when the user is in a hurry. In some embodiments, a "reset" of the content in the storing means, i.e. the handbag, the briefcase, the pocket has to be performed when arriving at home, i.e. items are put in and/or out of the storing means.

Furthermore, when the user is searching for any missing item 150, the mobile electronic device 100 may be directed or aimed at locations where it is most likely to find the missing item for facilitating the search scan of the item.

The invention claimed is:

1. A system for RFID data communication, comprising:
   at least one RFID tag for tagging a portable item;
   a RFID reader arranged to receive radio waves received from the RFID tag to render RFID tag data;
   a mobile electronic device with a control unit operatively connected to the RFID reader, and having a memory for storing a plurality of RFID tag data, and for storing profiles associated with specific RFID tag data relating to specific portable items;
   wherein the control unit is configured to:
   select a profile either automatically or after manual initiation by the user,
   compare the received RFID tag data with RFID tag data stored in the memory for the selected profile, and
   if RFID tag data of at least one item associated with the selected profile is not among the received RFID tag data, load and execute an application for alerting the user.

2. A mobile phone comprising a mobile electronic device according to claim 1, wherein the control unit is operatively connected to a display and a GSM/UMTS radio.

3. A radio communication device for RFID data communication, comprising a RFID reader operatively connected to a mobile electronic device according to claim 1.

4. A system for RFID data communication according to claim 1, wherein the portable item is at least one of the following items: purse, key, lipstick, umbrella, gym entrance card, make-up, commuter-card, credit/ID/parking card, car keys, or lunch coupons.

5. A system according to claim 1, the system comprising a further RFID tag to be tagged onto a fixed position, wherein the control unit is configured to automatically select the profile after receiving RFID tag data from the further RFID tag.

6. A system according to claim 5, wherein the fixed position is an entrance door or exit door of a building and/or the control unit is configured to automatically execute the application after receiving RFID tag data from the further RFID tag.

7. A system according to claim 1, wherein the memory further stores a calendar, and wherein the control unit is configured to automatically select the profile according to a schedule of the calendar.

8. A system according to claim 7, wherein the control unit is configured to automatically execute the application according to a schedule of the calendar.

9. A system according to claim 1, wherein the application turns on an alarm, the alarm comprising a sound and/or vibration of the mobile electronic device.

10. A method for checking whether a user has least one portable item with him/her or not by using RFID data communication, comprising:
   providing at least one portable item with an RFID tag;
   storing, in a mobile electronic device, a plurality of RFID tag data and profiles associated with specific RFID tag data relating to specific portable items;
   selecting a profile either automatically or after manual initiation by the user;
   transmitting a radio signal to the RFID tag by means of a mobile electronic device;
   receiving a response signal comprising RFID tag data from the RFID tag associated with the portable item by the mobile electronic device;
   comparing the received RFID tag data with RFID tag data stored in the memory for the selected profile, and
   if RFID tag data of at least one item associated with the selected profile is not among the received RFID tag data, loading and executing an application for alerting the user.

11. A method for RFID data communication according to claim 10, wherein the portable item is at least one of the following items: purse, key, lipstick, umbrella, gym entrance card, make-up, commuter-card, credit/ID/parking card, car keys, or lunch coupons.

12. A method for RFID data communication according to claim 10, wherein the method further comprises:
   providing a fixed position with a further RFID tag;
   associating a profile with the further RFID tag; and
   selecting the profile automatically after receiving RFID tag data from the further RFID tag.

13. A method for RFID data communication according to claim 10, wherein the method further comprises automatically selecting the profile according to a schedule of a calendar.

* * * * *